(12) United States Patent
Konakawa (10) Patent No.: US 7,624,718 B2
(45) Date of Patent: Dec. 1, 2009

(54) ENGINE CONTROL SYSTEM, VEHICLE HAVING THE SAME, METHOD FOR CALCULATING COMBUSTION CENTER OF GRAVITY, AND METHOD FOR CONTROLLING ENGINE

(75) Inventor: Tsugunori Konakawa, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 121 days.

(21) Appl. No.: 10/597,558

(22) PCT Filed: Feb. 1, 2005

(86) PCT No.: PCT/JP2005/001378

§ 371 (c)(1),
(2), (4) Date: Aug. 11, 2008

(87) PCT Pub. No.: WO2005/073548

PCT Pub. Date: Aug. 11, 2005

(65) Prior Publication Data

US 2008/0289603 A1    Nov. 27, 2008

(30) Foreign Application Priority Data

Feb. 2, 2004    (JP) .............................. 2004-025547

(51) Int. Cl.
*F02P 5/00* (2006.01)
*G01L 23/22* (2006.01)

(52) U.S. Cl. ................................ 123/406.26; 73/35.08

(58) Field of Classification Search ............ 123/406.26, 123/406.45, 406.47, 406.28, 406.35, 406.37, 123/406.41, 406.42, 406.58; 73/35.08; 324/399
See application file for complete search history.

(56) References Cited

U.S. PATENT DOCUMENTS

| 4,417,556 | A | * | 11/1983 | Latsch ................... 123/406.42 |
| 5,452,603 | A | * | 9/1995 | Asano et al. ............. 73/114.67 |
| 5,676,113 | A | * | 10/1997 | Johansson et al. ....... 123/406.26 |
| 5,758,307 | A | * | 5/1998 | Haefner et al. .............. 701/101 |
| 6,334,353 | B1 | * | 1/2002 | Nobe et al. ................ 73/35.04 |
| 6,789,409 | B2 | * | 9/2004 | Tanaya ...................... 73/35.08 |

(Continued)

FOREIGN PATENT DOCUMENTS

JP    10-252632    9/1998

(Continued)

*Primary Examiner*—Stephen K Cronin
*Assistant Examiner*—Sizo B Vilakazi
(74) *Attorney, Agent, or Firm*—Keating & Bennett, LLP (57) ABSTRACT

An engine control system enables engine control to cause ignition timing to approximate MBT without necessarily measuring torque and combustion pressure. The negative ion current in an engine combustion chamber is measured and a first crank angle B corresponding to a first rate in change of the negative ion current curve E is identified. A second crank angle C corresponding to a second rate in change of the negative ion current curve E also is identified. The ignition timing is controlled based upon a third crank angle G that generally is a midpoint between the first crank angle B and the second crank angle C. The third crank angle G becomes a specified target crank angle.

10 Claims, 7 Drawing Sheets

U.S. PATENT DOCUMENTS

| | | | |
|---|---|---|---|
| 6,877,485 B2 * | 4/2005 | Fischer | 123/472 |
| 6,915,776 B2 * | 7/2005 | zur Loye et al. | 123/304 |
| 6,935,310 B2 * | 8/2005 | Viele et al. | 123/406.27 |
| 6,998,846 B2 * | 2/2006 | Daniels et al. | 324/399 |
| 2002/0021120 A1 * | 2/2002 | Raichle et al. | 324/96 |
| 2004/0084035 A1 * | 5/2004 | Newton | 123/630 |
| 2005/0092287 A1 * | 5/2005 | Tozzi et al. | 123/305 |
| 2007/0079817 A1 * | 4/2007 | VanDyne et al. | 123/568.21 |
| 2008/0040020 A1 * | 2/2008 | Henein | 701/109 |

FOREIGN PATENT DOCUMENTS

| | | |
|---|---|---|
| JP | 2001-280194 | 10/2001 |
| JP | 2001-280229 | 10/2001 |
| JP | 2002-266739 | 9/2002 |

\* cited by examiner

ENGINE CONTROL SYSTEM, VEHICLE HAVING THE SAME, METHOD FOR CALCULATING COMBUSTION CENTER OF GRAVITY, AND METHOD FOR CONTROLLING ENGINE

CROSS-REFERENCE TO RELATED APPLICATIONS

This application is a U.S. National Phase application of International Application No. PCT/JP2005/001378, filed Feb. 1, 2005, which is based upon and claims priority to Japanese Patent Application No. 2004-025547, filed Feb. 2, 2004 each of which is hereby incorporated by reference in its entirety.

BACKGROUND OF THE INVENTION

1. Field of the Invention

The present invention relates to an engine control system, a vehicle having the same, a method for calculating the combustion center of gravity of an engine, and a method for controlling an engine.

2. Description of the Related Art

A well-known method for optimizing the ignition timing of spark ignition internal combustion engines is a method of determining ignition timing on the basis of negative ion current in the cylinder (e.g., JP-A-6-33855). In the method disclosed in Patent Document 1, negative ion current flowing in the cylinder directly after ignition is measured, and the time from the ignition at which the value of the negative ion current becomes the maximum is determined. Then the time difference between the determined time and minimum spark advance for best torque (MBT) is calculated, and the calculated time difference is added to or subtracted from the preceding ignition timing to thereby determine the present ignition timing.

SUMMARY OF THE INVENTION

Thus, conventional ignition timing control using negative ion current is based on the following assumptions:

(1) The maximum negative ion current after ignition correlates with combustion pressure.

(2) The peak of combustion pressure is at 15° after top dead center when the engine operates with an MBT (i.e., Maximum Best Timing for torque) ignition timing.

(3) Therefore, adjusting the ignition timing so that the maximum negative ion current is adjusted to 15° after top dead center correlates the ignition timing with MBT.

However, the maximum combustion pressure actually depends upon the operating conditions of the engine. Assumption (2) therefore is not always true. Specifically, for example, at MBT during which combustion speed is low, the ion current peak position does occur at 15° after top dead center. Thus, the conventional control does not adequately function over a wide operating region.

Accordingly, it is an object of one embodiment of the present invention to provide a system or method capable controlling ignition timing to better agree with MBT timing over a wide range of operating conditions to thereby increase fuel efficiency, reduce exhaust gas, and/or improve drivability without measuring torque and combustion pressure.

One aspect of an embodiment of the present invention relates to an engine control system arranged and configured in accordance with certain features, aspects and advantages of the present invention comprises an ion current measuring unit that is adapted to measure the negative ion current in a combustion chamber of an engine. The system also comprises a crank-angle measuring unit that is adapted to measure an engine crank angle. The system also comprises a controller that is adapted to control the engine on the basis of a first crank angle at which an increase rate of the negative ion current relative to the crank angle exceeds a first specified value and a second crank angle at which the increase rate becomes a second specified value after exceeding the first specified value.

Another aspect of an embodiment of the present invention relates to a method for calculating a combustion center of gravity of an engine. The method comprises: measuring a negative ion current in a combustion chamber of the engine; determining a first crank angle at which an increase rate of the negative ion current relative to the engine crank angle exceeds a first specified value; determining a second crank angle at which the increase rate becomes a second specified value after exceeding the first specified angle; and calculating the combustion center of gravity from the first crank angle and the second crank angle.

A further aspect of the present invention relates to a method for controlling operation of an engine. The method includes the steps of: measuring a negative ion current in a combustion chamber of the engine; determining a first crank angle at which the increase rate of the negative ion current relative to an engine crank angle exceeds a first specified value; determining a second crank angle at which the increase rate becomes a second specified value after exceeding the first specified angle; and controlling the engine on the basis of the first crank angle and the second crank angle.

Another aspect of the present invention relates to configurations in which the first specified value defines a rising point and the second specified value defines a peak point of the negative ion current on a negative ion current characteristic curve. Thus, as distinct from the control or calculation based only on the peak point of negative ion current, control is improved even when the peak point shifts as the operating state changes. Accordingly, the ability to adjust the ignition timing to approximate MBT is improved over a wide operating region without necessarily measuring torque and combustion pressure.

BRIEF DESCRIPTION OF THE DRAWINGS

These and other features, aspects and advantages of the present invention will now be described with reference to the drawings of a preferred embodiment, which embodiment is intended to illustrate and not to limit the invention. The figures comprise nine drawings.

FIG. 5(a) shows characteristic curves for heat rate and combustion mass ratio while FIG. 5(b) shows a characteristic curve for negative ion current.

FIG. 6 is a graph showing the relationship between engine speed and ignition timing, and combustion center of gravity and so on.

FIG. 7 is a graph showing the relationship between ignition timing and torque, combustion center of gravity and so on.

FIG. 8 is a graph showing the relationship between ignition timing and torque, combustion center of gravity and so on.

DETAILED DESCRIPTION OF THE PREFERRED EMBODIMENT

An embodiment that is arranged and configured in accordance with certain features, aspects and advantages of the invention will be described with reference to the drawings.

Figure 1:
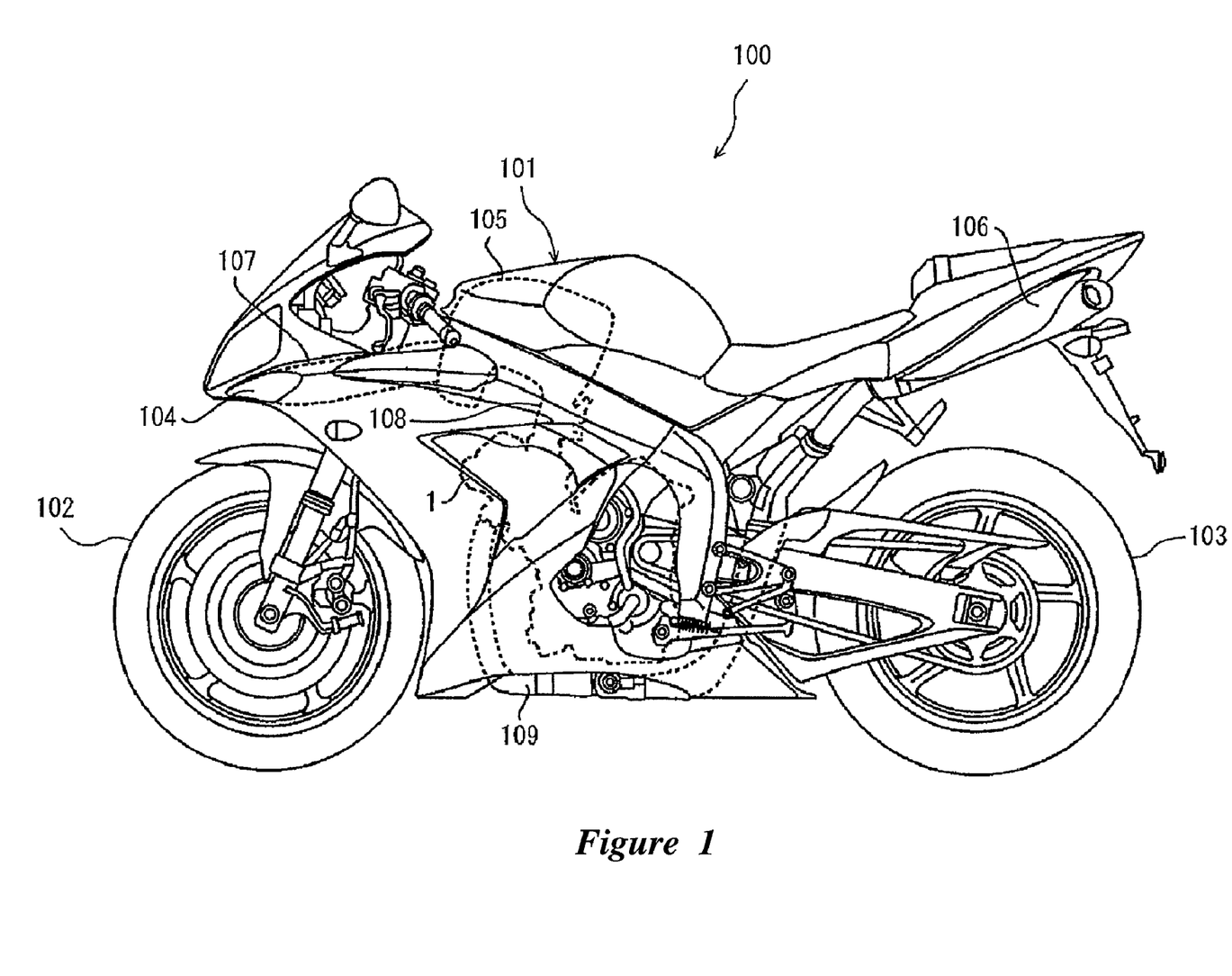
FIG. 1 is a side view of a motorcycle according to an embodiment.

Referring to FIG. 1, a vehicle according to the embodiment is a vehicle comprising an engine 1, specifically, a motorcycle 100, which is a kind of saddle-type vehicle. The motorcycle 100 comprises a body 101, a front wheel 102, and a rear wheel 103. The body 101 comprises an air intake port 104, an air cleaner 105, the engine 1, and a muffler 106. The air intake port 104 and the air cleaner 105 can be connected via an intake duct 107. The air cleaner 105 and the engine 1 can be connected via an intake pipe 108. The engine 1 and the muffler 106 can be connected via an exhaust pipe 109.

The engine 1 preferably is a spark-ignition internal combustion engine, which is, in this embodiment, a water-cooled four-cycle multiple cylinder type. Alternatively, the engine 1 can be an air-cooled type. The number of cylinders of the engine 1 is not limited but may be, for example, one in certain embodiments.

Figure 2:
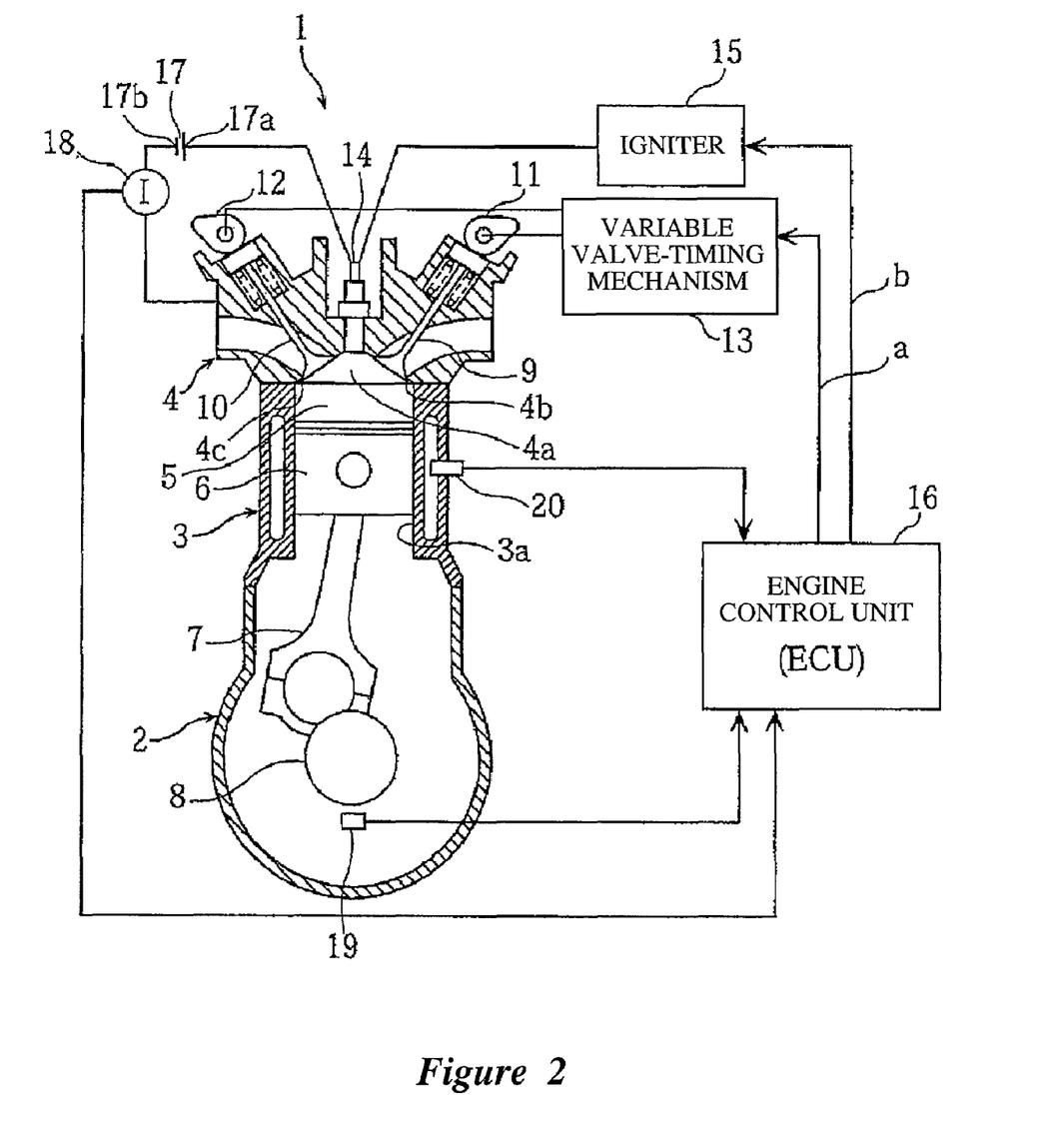
FIG. 2 is a schematic diagram of an engine.

Referring to FIG. 2, the engine 1 comprises a crankcase 2, a cylinder block 3 connected to the crankcase 2, a cylinder head 4 fixed onto the cylinder block 3, and a head cover (not shown) connected to the cylinder head 4. The cylinder block 3 comprises a cylinder bore 3a therein, in which a piston 6 is disposed. The piston 6 connects to a connecting rod 7. The connecting rod 7 connects to a crankshaft 8 disposed in the crankcase 2.

The cylinder head 4 comprises a recess 4a on the surface adjacent to the cylinder block 3. The recess 4a, the piston 6, and the cylinder bore 3a define a combustion chamber 5. The cylinder head 4 comprises an intake valve opening 4b and an exhaust valve opening 4c which are open to the recess 4a. The cylinder head 4 also comprises an intake valve 9 and an exhaust valve 10 for opening and closing the intake valve opening 4b and the exhaust valve opening 4c, respectively.

The intake valve 9 and the exhaust valve 10 can be opened or closed by an intake camshaft 11 and an exhaust camshaft 12, respectively. The intake camshaft 11 and the exhaust camshaft 12 preferably connect to a variable valve timing mechanism 13. The variable valve timing mechanism 13 receives a valve-timing control signal a from an engine control unit (hereinafter, referred to as an ECU) 16 to control the open-close timing of the intake valve 9 and the exhaust valve 10 by the intake camshaft 11 and the exhaust camshaft 12, respectively.

An ignition plug 14 can be placed in the cylinder head 4. The ignition plug 14 can be disposed substantially at the center of the recess 4a. The electrode of the ignition plug 14 can be exposed to the inner surface of the recess 4a. The ignition plug 14 preferably connects to an igniter 15. The igniter 15 receives an ignition-timing control signal b from the ECU 16 to control the spark generation timing of the ignition plug 14.

In one presently preferred embodiment, the ignition plug 14 advantageously comprises a negative ion current probe. The ignition plug 14 connects to a positive electrode 17a of a battery 17. A negative electrode 17b of the battery 17 preferably connects to the cylinder head 4 via a wattmeter 18 for grounding. Thus, the ignition plug 14 generally is positively charged. In some embodiments, the negative ion current probe may be provided separately.

The engine 1 preferably comprises a crank-angle sensor 19 and a knock sensor 20 for detecting knocking. Detection signals from the crank-angle sensor 19 and the knock sensor 20 can be input to the ECU 16. As will be described later, when knocking is detected by the knock sensor 20, the ignition timing control by the ECU 16 can be adjusted to reduce or eliminate the knocking.

The negative ion current generated in the combustion chamber 5 varies as combustion progresses. Specifically, when the ignition plug 14 ignites the air fuel mixture in the combustion chamber 5, a first chemical action is activated. The first chemical reaction causes electrons in atoms or molecules to collide with one another, which generates energy. The atoms or molecules thus become excited, which causes sufficient heat release to shift to an energy state higher than a normal stable state. In the excited state, chemical light emissions in ultraviolet ray spectrum occurs, which results in an increase in positive ions. As a result, the negative ion current in the combustion chamber 5 increases. The negative ion current is collected by the ignition plug 14 (i.e., the negative ion-current probe) and the value detected by the wattmeter 18 is input into the ECU 16.

Figure 3:
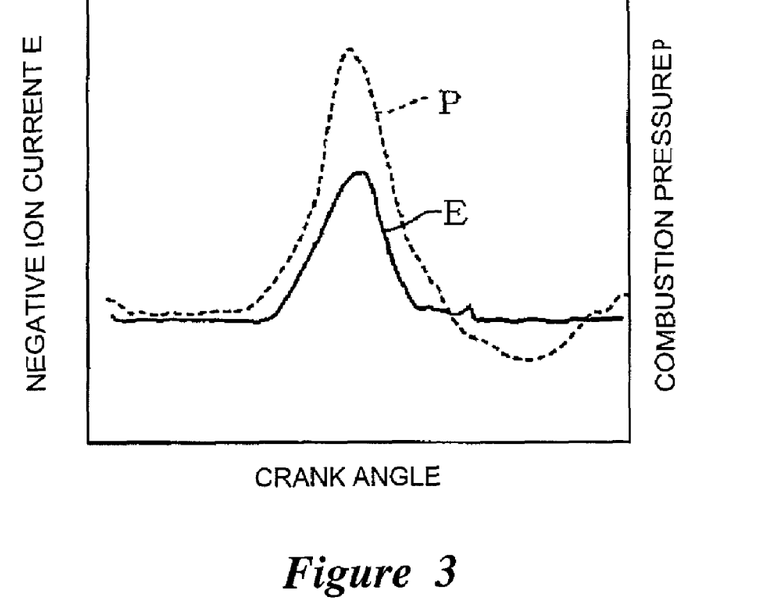
FIG. 3 is a characteristic diagram of negative ion current and combustion pressure plotted against crank angles.

FIG. 3 shows characteristic curves of negative ion current E and combustion pressure P plotted against crank angles. As shown in FIG. 3, the characteristic of the negative ion current E exhibits almost the same tendency as that of the combustion pressure P. In other words, the negative ion current B peaks as substantially the same crank angle as the combustion pressure P peaks. The negative ion current E can therefore be used as information indicative of changes in combustion pressure P, flame area, or heat release.

Figure 4:
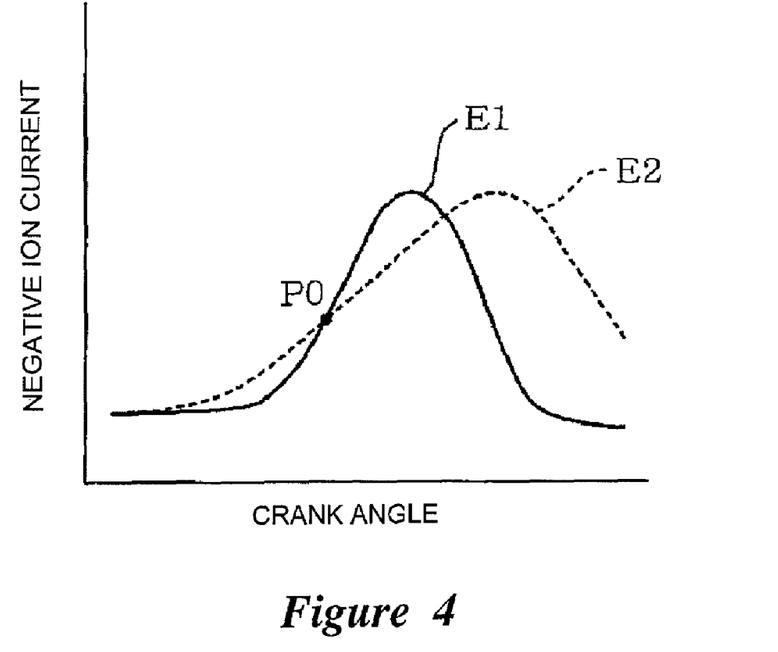
FIG. 4 shows two different characteristic curves of negative ion current plotted against crank angles.

However, the crank angle at which the combustion pressure P becomes the maximum depends on the operating state of the engine 1. Accordingly, the peak position of the negative ion current E depends on the operating state of the engine 1 (refer to FIG. 4, which is merely a conceptual diagram for explanation, and is not based on actual measurement data). Therefore, the control based only on the peak position of the characteristic curve of the negative ion current E cannot flexibly cope with changes in engine load, so that it cannot be applied to a wide variety of operating state.

However, the inventor has realized the following points. Specifically speaking, as has been described, even when the ignition timing is at MBT, the characteristic curve of the negative ion current E varies as the operating state of the engine 1 varies (refer to curves E1 and E2 of FIG. 4), so that the crank angle corresponding to the peak position of the characteristic curve changes. However, crank angles that change little even if the operating state changes can be calculated from a plurality of crank angles corresponding to a plurality of points on the characteristic curve, such as crank angles corresponding to a combustion center of gravity. In other words, some intersections between a set crank angle and the characteristic curve are generally consistent with respect to the detected negative ion current. Point P0 in FIG. 4 indicates an intersection corresponding to such a crank angle. Controlling based on this crank angle enables flexible response to fluctuations in load, allowing control applicable to wide operating regions without necessarily measuring torque and combustion pressure.

A specific example of the control will be described hereinbelow. An operation control that can be used to adjust ignition timing to MBT will first be described.

Figure 5:
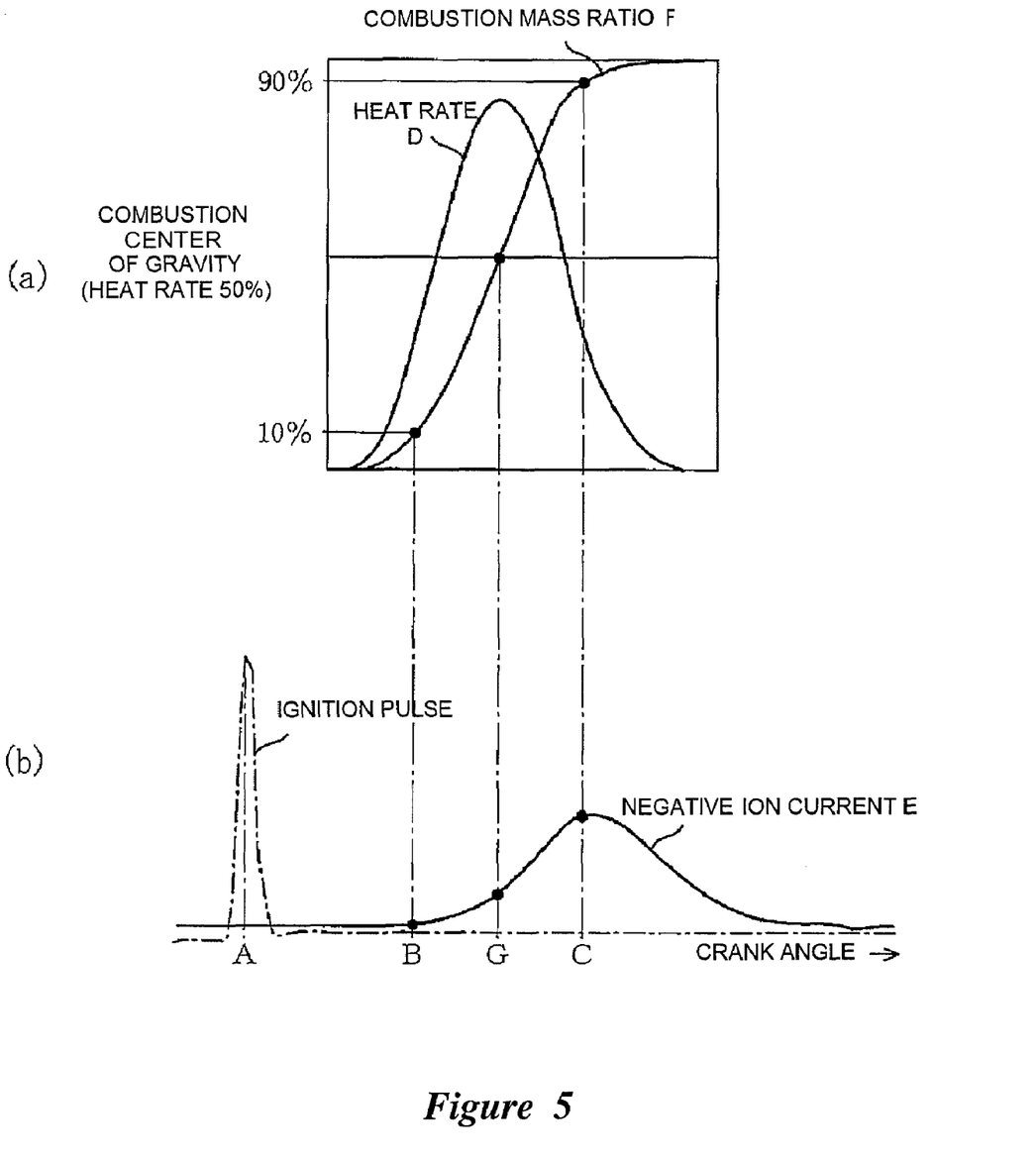

FIG. 5(b) shows a variation of the negative ion current E plotted against crank angles; FIG. 5(a) shows variations in heat rate D and combustion mass ratio F also plotted against crank angles. Referring to FIG. 5(b), symbol A indicates a crank angle for an ignition point; symbol B indicates a crank angle for any rising point of the ion current on the ion-current curve (hereinafter, referred to as a first crank angle); and symbol C indicates a crank angle for any peak point of the ion current (hereinafter, referred to as a second crank angle).

As can be inferred from the graphical presentation shown in FIG. 5(a) and (b), at the rising point crank angle, the ion current increase changes from less that a specified value (hereinafter, referred to as a first specified value) to an ion current increase value that is more than that first specified value. In other words, the slope of the line E in FIG. 5(b) increases from the first value to a value more than the first value. At the peak of the ion current, the ion current increase falls from the first specified value or a value higher than the first specified value to a second specified value (hereinafter, referred to as a second specified value, which may be different from or equal to the first specified value) or a value lower than the second specified value. In other words, at the peak of the ion current, the slope of the line E decreases from a value equal to or greater than the first specified value to a value equal to or less than a second specified value. Accordingly, the point at which the increase rate becomes the first specified value or a value higher than the first specified value can be referred to as a rising point, and the point at which the increase rate becomes the first specified value and then becomes the second specified value or a value less than the second specified value can be referred to as a peak point. The method for determining the rising point and the peak point is not limited at all. For determining the rising point and the peak point, there is no need to calculate the actual increase; for example, the rising point and the peak point can be determined by comparing the values of the ion current and a predetermined threshold.

In the illustrated embodiment, the first crank angle B is set to a crank angle corresponding to the rising point of the ion current curve, and the second crank angle C is set to a crank angle generally corresponding to the peak point of the ion current curve. The first crank angle B and the second crank angle C, however, may not exactly agree with the rising point and the peak point, respectively, but may be slightly off the rising point and the peak point because of measurement error or disturbance. In short, the first crank angle B and the second crank angle C may be substantially regarded as the rising point and the peak point, respectively.

As shown in FIGS. 5(a) and 5(b), the negative ion current generating point (the position corresponding to the first crank angle B) generally correlates with the beginning of combustion. This point preferably follows an ignition delay time, which follows the discharge of the ignition plug 14, and this point preferably is the point at which heat release begins by the start of the initial combustion. The peak point thereafter (the position corresponding to the second crank angle C) preferably is substantially the point of maximum heat release during combustion. Accordingly, substantially the midpoint thereof is generally estimated to correspond to the combustion center of gravity.

The substantially middle point between the first crank angle B and the second crank angle C can therefore be regarded as a crank angle (hereinafter, referred to as a third crank angle) G, which generally corresponds to the combustion center of gravity. Thus, the combustion center of gravity can be calculated from the first crank angle B and the second crank angle C. As will be described later, when the ignition timing is at MBT, the combustion center of gravity does not vary greatly even if the load varies. Accordingly, in this embodiment, the ECU 16 presets the crank angle corresponding to the combustion center of gravity at MBT as a target crank angle, and controls the ignition timing of the igniter 15 so that the third crank angle determined by measuring the negative ion current agrees with the target crank angle.

When the ignition timing is at MBT, the combustion center of gravity does not vary greatly by load fluctuations. Accordingly, the target crank angle may be set without much variation caused by engine load. In some embodiments, the target crank angle may be a fixed value. On the other hand, the target crank angle may depend on the operating characteristics of the engine 1, or may be appropriately varied on the basis of an operational expression (e.g., function or mathematical equation) or a table containing parameters.

Figure 6:
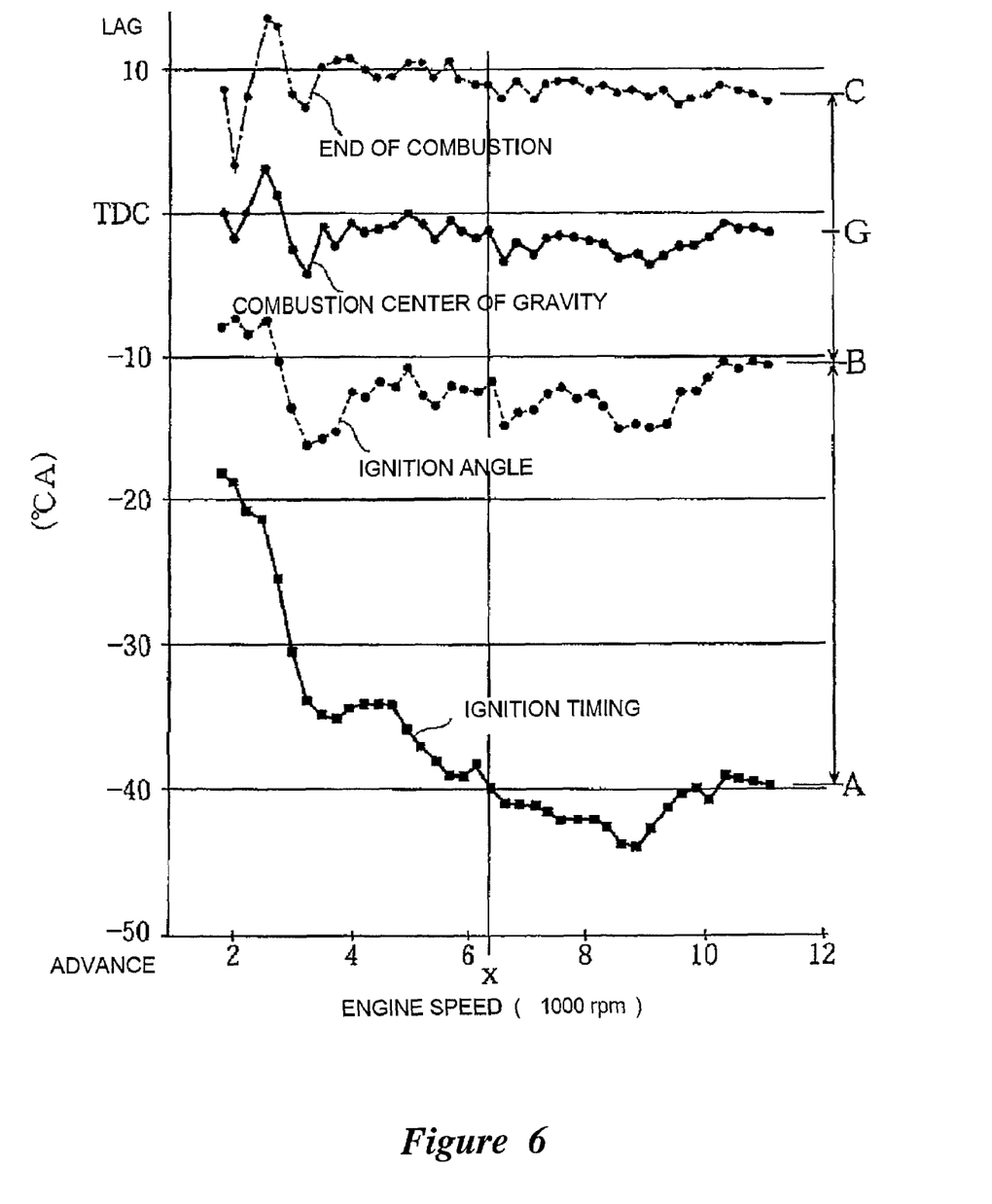

FIG. 6 shows the relationship between engine speed and ignition timing, combustion center of gravity, and so on. As discussed above, the combustion center of gravity preferably is calculated from the first crank angle B and the second crank angle C. Referring to FIG. 6, the first crank angle B, the second crank angle C, and the third crank angle G indicate "spark ignition angle", "the end of combustion", and "the combustion center of gravity", respectively. The interval between A and B indicates an ignition delay period, and the interval between B and C indicates a combustion period. In this embodiment, the target crank angle corresponding to the combustion center of gravity preferably is set at about 1-5° before top dead center. The ignition timing is feed-back controlled so that the third crank angle G becomes the target crank angle (1-5° before the top dead center). Depending upon the application, there may be some variation in the target crank angle.

Figure 7:
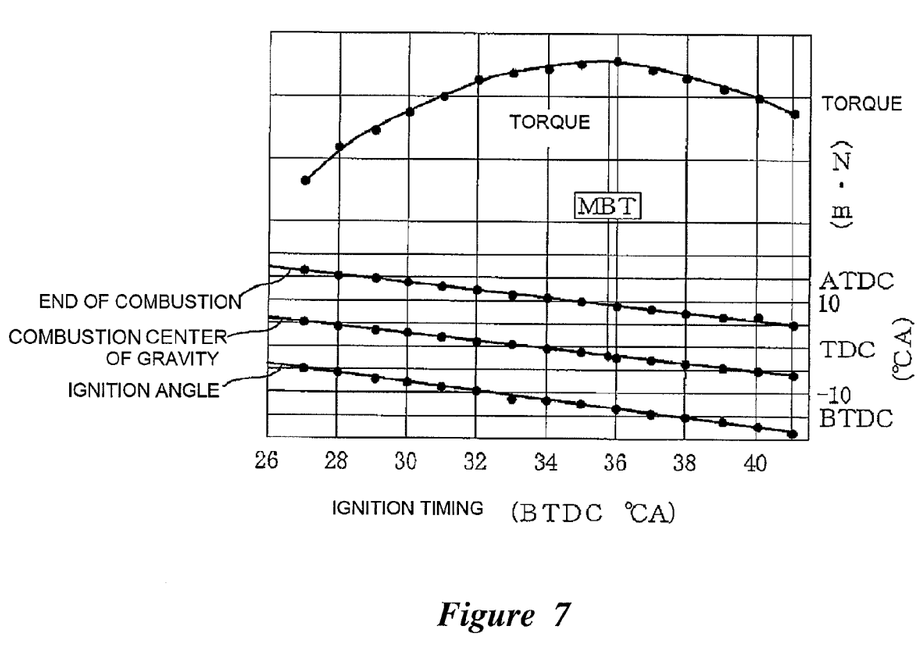

FIG. 7 shows the relationship between ignition timing and torques and combustion center of gravity, and so on. As shown in FIG. 7, the torque depends on ignition timing, and becomes the maximum when the ignition timing is at MBT. On the other hand, as the ignition timing advances to the top dead center, the combustion center of gravity shifts from the position of after top dead center to the position of before top dead center. The torque therefore increases as the combustion center of gravity moves from the position of after top dead center to the position of before top dead center, and becomes the maximum when the combustion center of gravity is about at 2-3° before the top dead center, and in turn decreases as the combustion center of gravity moves toward the before top dead center.

The graph shows that when the ignition timing is controlled so that the third crank angle G (a crank angle corresponding to the combustion center of gravity) becomes about 2-3° before top dead center, the ignition timing becomes about 35-36° before top dead center, so that the ignition timing generally agrees with MBT.

As has been described, by the control according to the embodiment, the target value of the third crank angle G does not vary significantly due to variations in the operating state. Accordingly, in the case of complicated varying of the lift amount and the open-close timing of the intake valve 9, or in the case of simply varying the engine load conditions such as engine rotation speed and throttle opening, the ignition timing can easily be brought into general alignment with MBT by the above-described control using the measurement of the negative ion current in the combustion chamber 5.

An experiment by the inventor shows that, for example, for MBT at a specific operating state x of a specific internal combustion engine, the first crank angle B at which a negative ion current at the beginning of combustion occurs at about 11° before top dead center, and the second crank angle C at which the negative ion current peaks thereafter occurs at about 9° after top dead center. The difference between the second crank angle C and the first crank angle B was about 20°, and the third crank angle G in the center thereof was about 10° after the first crank angle B, or about 1° before top dead center.

Figure 8:
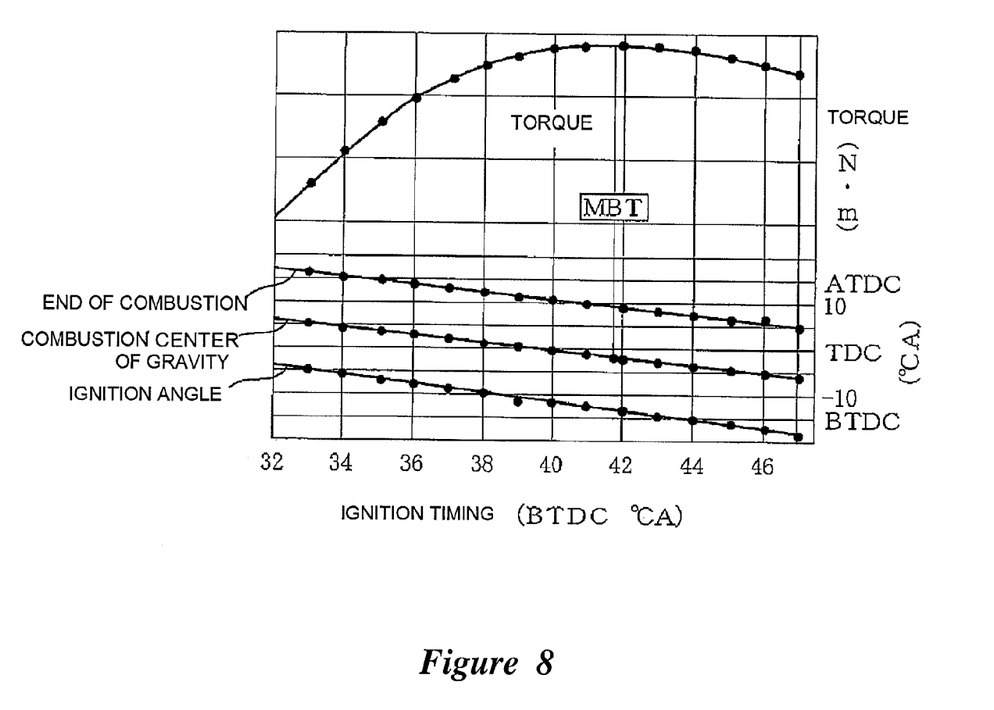

Then, for the internal combustion engine, the third crank angle G was measured under different load conditions. Specifically, the load conditions were changed by changing the throttle opening or rotation speed. The measurement of the third crank angle (the angle in the middle between the first crank angle B and the second crank angle C) G shows that, although the rising point and the peak point of the negative ion current curve varies, the third crank angle G is always about 1° before top dead center under any load condition. Briefly, with the internal combustion engine, the third crank angle G at which the ignition timing is at MBT was substantially the same at all load conditions. For example, the comparison between FIGS. 7 and 8 indicating torque characteristic etc. under different load conditions shows that the third crank angles G at which the ignition timing generally agrees with MBT are both about 1° before top dead center.

Under the same conditions of bore/stroke ratio and connecting rod ratio (λ), the combustion speed changes as the rotation speed and load of the engine 1 change, so that the first crank angle B and the second crank angle C determined from the negative ion current changes. However, the third crank angle G corresponding to the combustion center of gravity is held substantially constant at MBT.

Conventionally, heat release has been estimated from pseudo combustion mass ratio converted from combustion pressure. According to the estimation, about 30% of the entire heat release distribution at MBT has been estimated to be located before top dead center, while the remaining 70% has been estimated to be located after top dead center, and the combustion center of gravity has been estimated to be located after top dead center.

However, by the method for calculating combustion center of gravity according to the embodiment, the combustion center of gravity is in the vicinity of top dead center, or more specifically, 1-5° before top dead center. The difference may be by the following reasons: most of negative ions during combustion generate at the excitation of cool flame and blue flame. However, the heat release determined from combustion pressure is the result of light emission of amplitude transition, such as flaming reaction after cool flame and blue flame, or solid-state radiation around infrared rays. Accordingly, the conventional method takes little thought of the excitation, so that the combustion center of gravity determined from combustion pressure may be delayed behind the combustion center of gravity based on the negative ion current as in the embodiment.

The control method according to one embodiment of the present invention is a method of controlling the engine 1 by measuring a negative ion current, which is unpaired electrons, during true combustion and controlling the engine 1 on the basis of the negative ion current, not by estimating an instantaneous value of the thermal conductivity of combustion gas from combustion pressure as in the past. Thus, the embodiment can reduce errors in calculating the combustion center of gravity, thus increasing control accuracy. Also, the embodiment can facilitate control of the engine 1 without a dedicated sensor in the combustion chamber 5.

While the control according to the embodiment is such that ignition timing is adjusted to MBT so as to obtain a maximum torque, other configurations are possible. For example, in an operating state in which knocking may occur, knocking can be reduced or prevented by disabling the control or by setting the target value of the third crank angle G later than the target value of the embodiment (a target value for MBT). It is also possible to reduce or prevent knocking by detecting knocking with the knock sensor 20, and disabling the control according to the detection result or by setting the target value of the third crank angle G to a delayed position.

The combustion center of gravity by the negative ion current varies significantly at flame off due to exhaust gas recirculation (EGR) in which exhaust gas is recirculated in intake gas, a lean-burn air-fuel ratio state, or a stratified-charge combustion state. Thus, it is also possible to control the EGR rate and air-fuel ratio on the basis of the fluctuations of the combustion center of gravity per unit time to prevent flame off. In short, the control according to the invention may also be used to reduce or prevent the flame off of the engine 1.

For EGR (since the structure for EGR is well known, a description thereof will be omitted), it is possible to calculate a third crank angle corresponding to the combustion center of gravity by the above-described method, and calculate the fluctuation of the third crank angle, and to control the EGR rate such that the EGR rate is decreased with increases in the sensed fluctuations. This enables control of the EGR rate without a specific sensor and can reduce or prevent flame off of the engine 1.

It is also possible to calculate a third crank angle corresponding to the combustion center of gravity by the above-described method, and calculate the fluctuation of the third crank angle, and to control the open-close timing of the intake valve 9 and the exhaust valve 10 of the engine 1 so that the overlap period of the intake valve 9 and the exhaust valve 10 decreases with increasing fluctuation. This enables control of valve timing without a specific sensor and can prevent flame off of the engine 1.

According to one embodiment, ignition timing can be correlated to MBT under a variety of operating states, including decreased combustion speed, thereby improving fuel efficiency, decreasing exhaust gas, and increasing drivability. Also, with a variable valve timing mechanism that controls the lift amount and open-close timing of an intake valve or when engine load conditions, such as rotation speed and throttle opening, are simply varied, for example, the ignition timing can easily be adjusted to MBT, allowing an optimum or preferable combustion state to be achieved. Also, controlling ignition timing so that combustion center of gravity is delayed behind MBT can reduce or eliminate knocking and reduce the generation of NOx components in the exhaust gas.

The calculation of the combustion center of gravity and operation control according to the embodiment are based on the characteristic of negative ion current for a crank angle sensed by the crank-angle sensor 19. However, the "crank angle" of the invention is nothing but a parameter indicative of the process of combustion; parameters that may be technical equivalents or proxies to the crank angle can also be regarded as the "crank angle". This is because such parameters have generally one-to-one correspondence with the crank angle. Accordingly, for example, it is also possible to specify the rising point of negative ion current on the basis of the actual crank angle, while specifying the peak point on the basis of another parameter (e.g., elapsed time) other than the actual crank angle.

Although the operation control system for the engine 1 according to the illustrated embodiment is mounted to the motorcycle 100, the engine control system is not necessarily mounted to vehicles. For example, the operation control system may be mounted to engine testing units, performance evaluation units, or applicable tools/Certain features, aspects and advantages of the present invention have advantages in vehicular application, for example, in vehicles such as motorcycles and in the control of the engines of such vehicles.

Moreover, although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What claimed is:

1. An engine control system comprising:
    an ion current measuring unit arranged to measure a negative ion current in a combustion chamber of an engine;
    a crank-angle measuring unit arranged to measure an engine crank angle; and
    a controller comprising:
        means for determining a first crank angle based on the negative ion current measured by the ion current measuring unit and the engine crank angle measured by the crank-angle measuring unit, the first crank angle being a crank angle corresponding to a rising point of the negative ion current at or above a first specified value on a negative ion current curve indicative of variations in negative ion current relative to crank angles;
        means for determining a second crank angle based on the negative ion current measured by the ion current measuring unit and the engine crank angle measured by the crank-angle measuring unit, the second crank angle being a crank angle corresponding to a peak point of the negative ion current on the negative ion current curve;
        means for calculating a substantial middle point between the first crank angle and the second crank angle as a third crank angle corresponding to a combustion center of gravity; and
        means for controlling an engine ignition timing so that the third crank angle approximates a desired target crank angle.

2. The engine control system according to claim 1, wherein the desired target crank angle is not changed according to engine load conditions.

3. The engine control system according to claim 1, wherein the desired crank angle corresponds to Maximum Best Timing.

4. The engine control system according to claim 1, wherein the desired crank angle corresponds to about 1° about 5° before top dead center of the crank angle.

5. The engine control system according to claim 1, wherein the desired target crank angle is set to a predetermined crank angle delayed behind Maximum Best Timing.

6. A vehicle comprising:
    the engine control system according to claim 1.

7. An engine control system comprising:
    an ion current measuring unit arranged to measure a negative ion current in a combustion chamber of an engine;
    a crank-angle measuring unit arranged to measure an engine crank angle; and
    a controller comprising:
        means for determining a first crank angle based on the negative ion current measured by the ion current measuring unit and the engine crank angle measured by the crank-angle measuring unit, the first crank angle being a crank angle corresponding to a rising point of the negative ion current at or above a first specified value on a negative ion current curve indicative of variations in negative ion current relative to crank angles;
        means for determining a second crank angle based on the negative ion current measured by the ion current measuring unit and the engine crank angle measured by the crank-angle measuring unit, the second crank angle being a crank angle corresponding to a peak point of the negative ion current on the negative ion current curve;
        means for calculating a substantial middle point between the first crank angle and the second crank angle as a third crank angle corresponding to a combustion center of gravity;
        means for calculating a variation rate of the third crank angle; and
        means for controlling an exhaust gas recirculation rate of the engine so that the exhaust gas recirculation rate decreases when the variation rate increases.

8. An engine control system comprising:
    an ion current measuring unit arranged to measure a negative ion current in a combustion chamber of an engine, the engine having an intake valve and an exhaust valve;
    a crank-angle measuring unit arranged to measure an engine crank angle; and
    a controller comprising:
        means for determining a first crank angle based on the negative ion current measured by the ion current measuring unit and the engine crank angle measured by the crank-angle measuring unit, the first crank angle being a crank angle corresponding to a rising point of the negative ion current at or above a first specified value on a negative ion current curve indicative of variations in negative ion current relative to crank angles;
        means for determining a second crank angle based on the negative ion current measured by the ion current measuring unit and the engine crank angle measured by the crank-angle measuring unit, the second crank angle being a crank angle corresponding to a peak point of the negative ion current on the negative ion current curve;
        means for calculating a substantial middle point between the first crank angle and the second crank angle as a third crank angle corresponding to a combustion center of gravity;
        means for calculating a variation rate of the third crank angle;
        means for controlling an open-close timing of the intake valve and the exhaust valve so that an overlap period of the intake valve and the exhaust valve decreases as the variation rate increases.

9. A method for calculating a combustion center of gravity of an engine, the method comprising:
    measuring a negative ion current in a combustion chamber of the engine;
    determining a first crank angle corresponding to a rising point of the negative ion current at or above a first specified value on a negative ion current curve indicative of variations in negative ion current relative to crank angles;
    determining a second crank angle corresponding to a peak point of the negative ion current on the negative ion current curve; and calculating a substantial middle point between the first crank angle and the second crank angle as a combustion center of gravity.

10. A method for controlling the operation of an engine, the method comprising:

measuring a negative ion current in a combustion chamber of the engine;

determining a first crank angle corresponding to a rising point of the negative ion current at or above a first specified value on a negative ion current curve indicative of variations in negative ion current relative to crank angles;

determining a second crank angle corresponding to a peak point of the negative ion current on the negative ion current curve;

calculating a substantial middle point between the first crank angle and the second crank angle as a third crank angle corresponding to a combustion center of gravity; and controlling engine ignition timing so that the third crank angle approximates a desired target crank angle.

* * * * *